US012292019B1

(12) United States Patent
Dudar

(10) Patent No.: US 12,292,019 B1
(45) Date of Patent: May 6, 2025

(54) METHODS AND SYSTEMS FOR FUEL SYSTEM INCLUDING DUAL PARALLEL FUEL VAPOR CANISTERS

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/403,101

(22) Filed: Jan. 3, 2024

(51) Int. Cl.
*F02M 25/08* (2006.01)

(52) U.S. Cl.
CPC .... *F02M 25/0836* (2013.01); *F02M 25/0872* (2013.01); *F02M 25/089* (2013.01); *F02M 2025/0845* (2013.01); *F02M 2200/247* (2013.01)

(58) Field of Classification Search
CPC ............. F02M 25/0836; F02M 25/089; F02M 25/0872; F02M 2025/0845; F02M 2200/247
See application file for complete search history.

(56) References Cited

U.S. PATENT DOCUMENTS

| | | | | | |
|---|---|---|---|---|---|
| 5,111,795 | A * | 5/1992 | Thompson | F02M 25/0872 | 123/519 |
| 5,165,379 | A * | 11/1992 | Thompson | B60K 15/03504 | 280/834 |
| 6,478,849 | B1 * | 11/2002 | Taylor | F02M 25/089 | 96/111 |
| 11,493,001 | B1 * | 11/2022 | Dudar | F02M 25/0818 | |
| 11,585,298 | B1 * | 2/2023 | Dudar | F02D 41/003 | |
| 11,719,198 | B1 * | 8/2023 | Dudar | F02M 25/089 | 123/520 |
| 11,964,554 | B2 * | 4/2024 | Dudar | B60K 15/03504 | |
| 12,163,494 | B2 * | 12/2024 | Dudar | F02M 25/0836 | |
| 12,173,672 | B2 * | 12/2024 | Dudar | F02M 25/0809 | |
| 2009/0007890 | A1 * | 1/2009 | Devries | F02M 25/089 | 123/520 |
| 2024/0247623 | A1 * | 7/2024 | Dudar | F02M 25/0836 | |
| 2024/0426265 | A1 * | 12/2024 | Dudar | B01D 53/0446 | |

* cited by examiner

*Primary Examiner* — Gonzalo Laguarda
(74) *Attorney, Agent, or Firm* — Vincent Mastrogiacomo; McCoy Russell LLP

(57) ABSTRACT

Methods and systems are provided for an evaporative emission fuel (EVAP) system. In one example, a system for the EVAP system includes a delta pressure sensor arranged between a first purge line coupled to a first canister and a second purge line coupled to a second canister arranged in parallel with the first canister.

20 Claims, 6 Drawing Sheets

METHODS AND SYSTEMS FOR FUEL SYSTEM INCLUDING DUAL PARALLEL FUEL VAPOR CANISTERS

FIELD

The present description relates generally to methods and systems for a fuel system comprising parallel vapor canisters.

BACKGROUND/SUMMARY

Vehicle emission control systems may be configured to store vapors from a fuel tank refueling and diurnal engine operations in a vapor canister. The stored vapors may be purged during a later engine operating condition. The stored vapors may be routed to an engine intake for combustion, which may increase fuel economy.

An amount of vapors stored onboard the vehicle may be proportional to a fuel tank size. As the fuel tank increases, a size of the canister may be increased to store a greater amount of vapors. However, larger canisters may increase a restriction in the vapor line, which may shut-off a fuel pump before 100% fuel level index is reached. To address this issue, some systems with larger fuel tanks may use at least two vapor canisters.

However, the inventors have identified some issues with the approaches described above. For example, including two vapor canisters may still be prone to the same issues single canister systems face during refueling. For example, canisters may include a natural variability in their restriction or one canister may develop a greater restriction over time due to being purged more, degradation of a carbon bed due to vibrations, and the like. If one canister is more restrictive than the other, then vapor flow favors the less restrictive canister. During some refueling events, the less restrictive canister may overload and spew vapors to the atmosphere, thereby increasing emissions. Thus, a method for balancing loading of parallel vapor canisters is desired.

In one example, the issues described above may be addressed by a system including a delta pressure sensor arranged between a first purge line coupled to a first canister and a second purge line coupled to a second canister arranged in parallel with the first canister. In this way, a load of the canisters may be comparatively determined and purging and/or filling of the canisters may be adjusted based on feedback from the delta pressure sensor.

As one example, if a purging event is occurring, a canister vent valve of a less loaded canister may be oscillated between open and closed positions. A canister vent valve of a more loaded canister may be maintained open to promote a greater amount of purging (e.g., vapor flow) from the more loaded canister compared to the less loaded canister, to the engine. As another example, if a refueling event is occurring, the canister vent valve of the more loaded canister may be oscillated between open and closed position. The canister vent valve of the less loaded canister may be maintained open to promote a greater amount of vapor flow to the less loaded canister. By doing this, a pressure differential of the less loaded canister and the more loaded canister may be decreased during the purging event and/or the refueling event.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
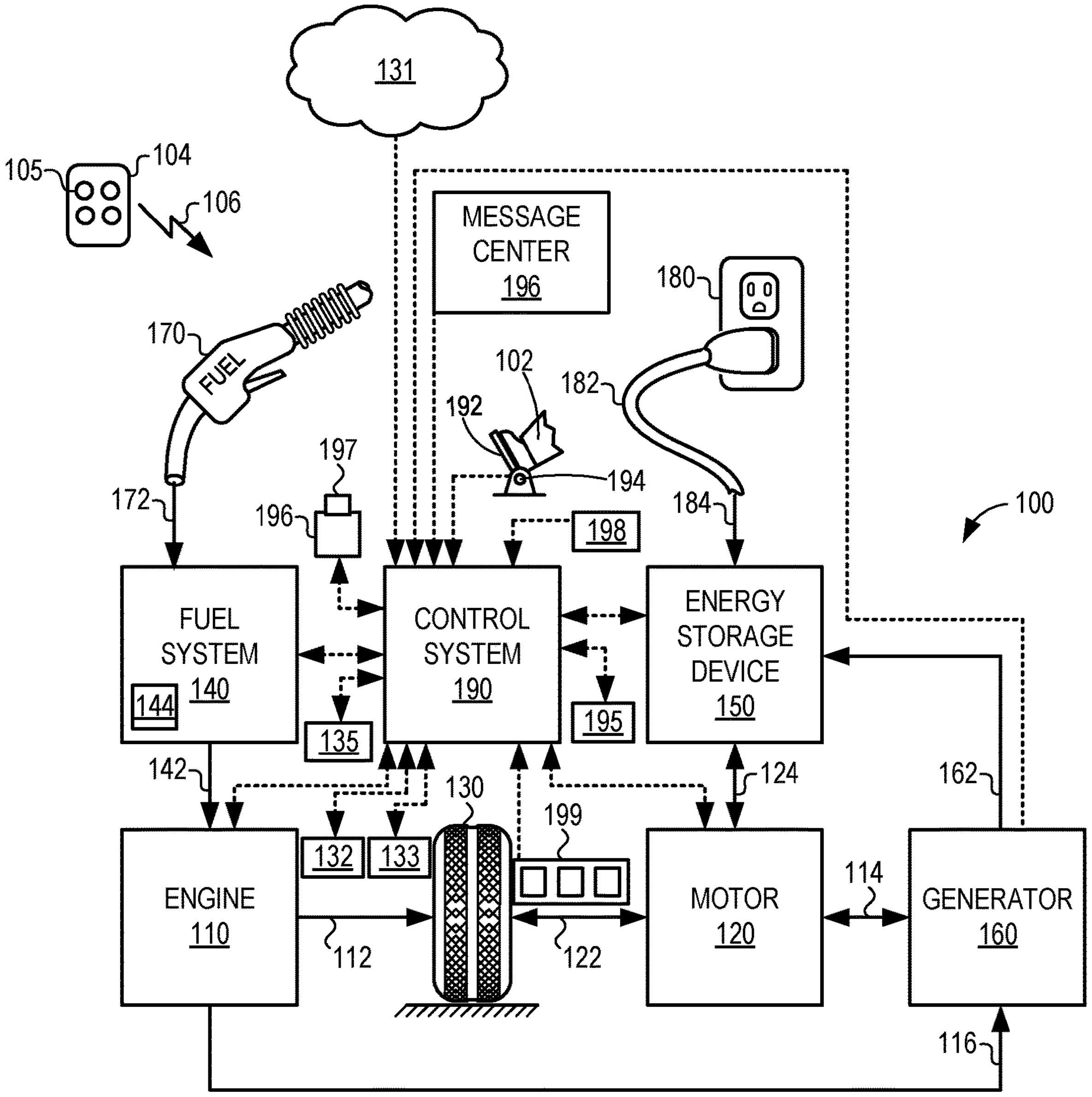
FIG. 1 illustrates a schematic of an engine included in a hybrid vehicle.
Figure 2:
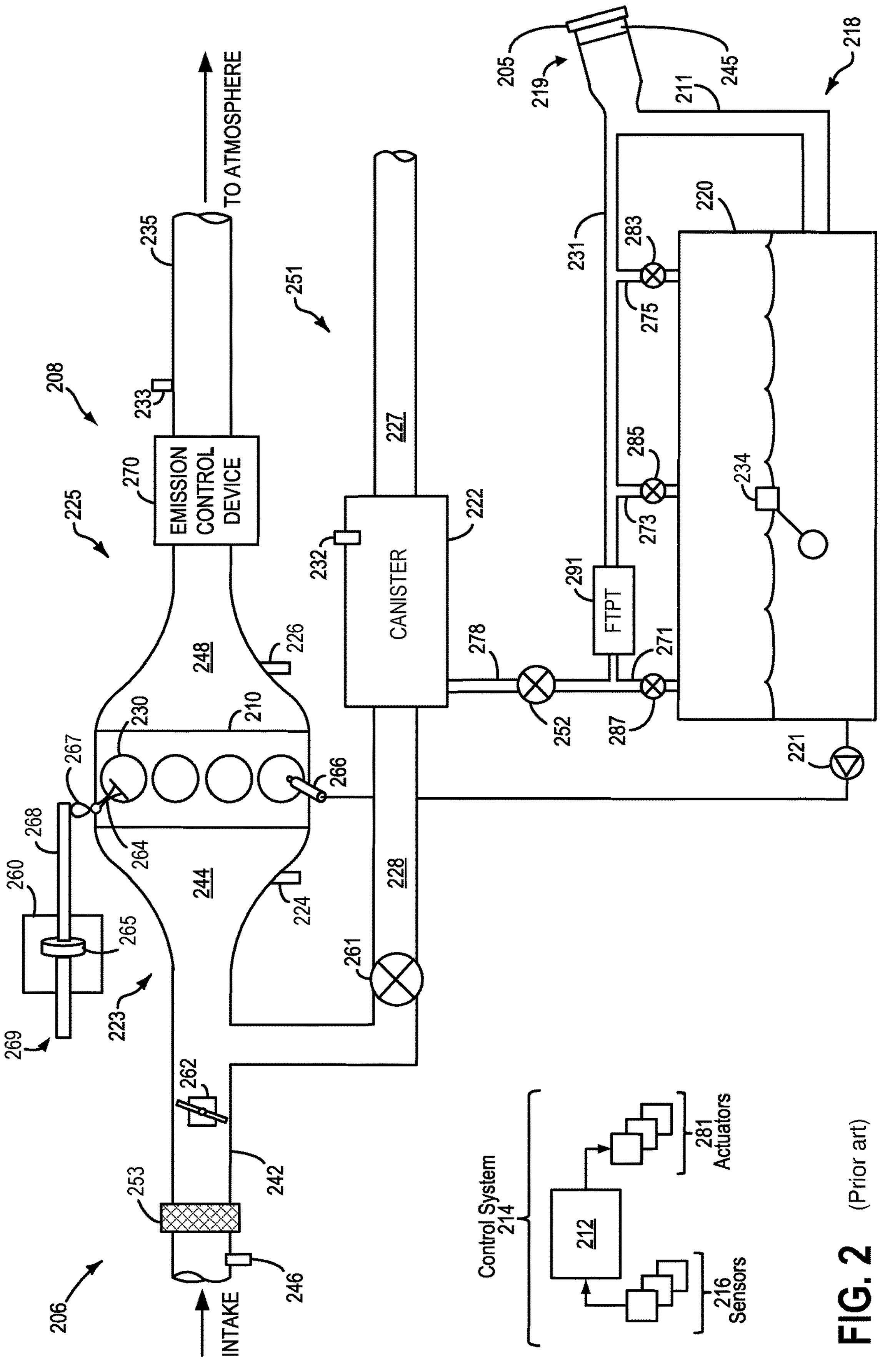
FIG. 2 (Prior art)
FIG. 2. illustrates a prior art example of an engine including a single canister.
Figure 3:
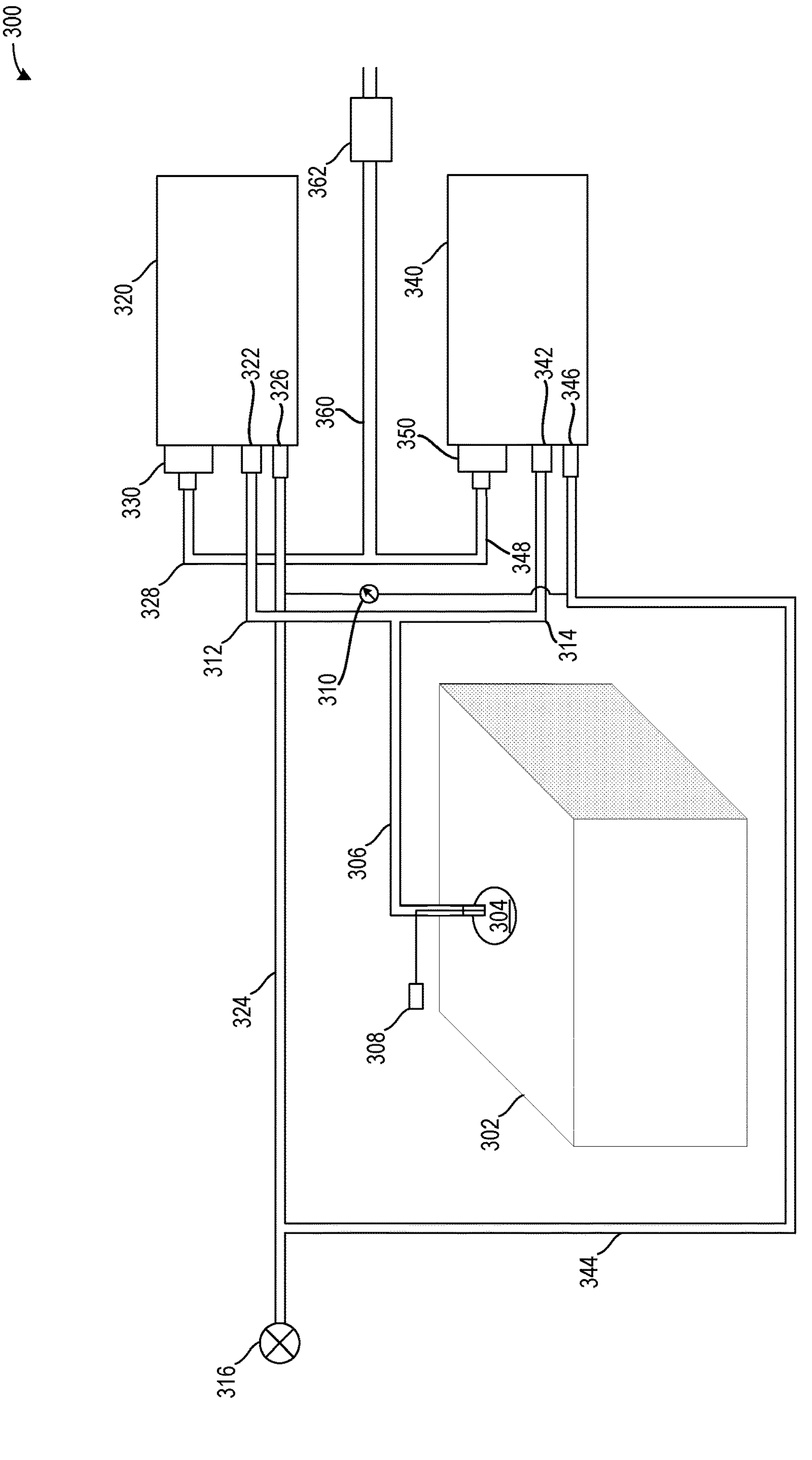
FIG. 3 illustrates the engine including canisters arranged in parallel.
Figure 4:
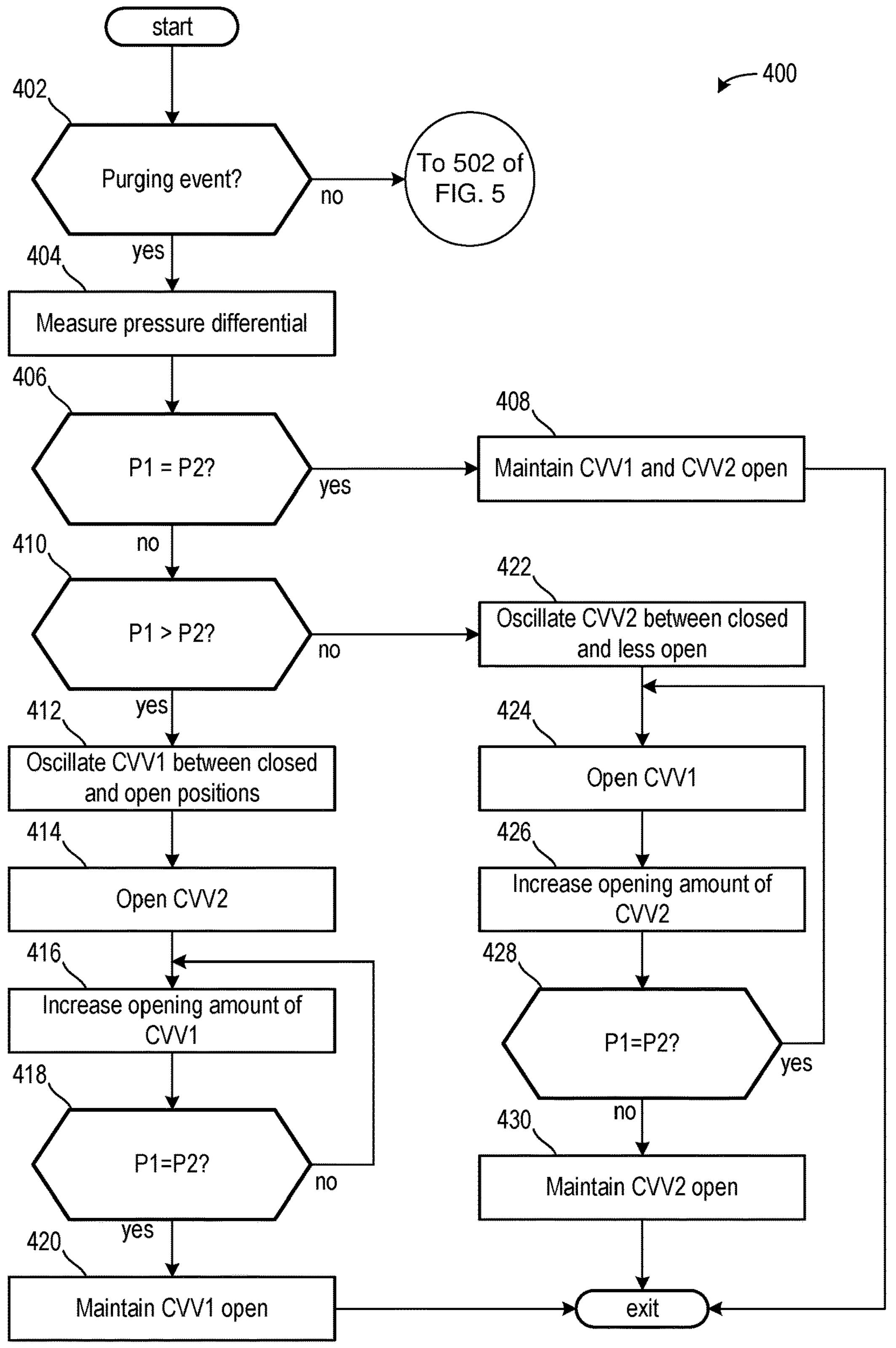
FIG. 4 illustrates a method for operating canister vent valves of canisters arranged in parallel in response to a differential pressure sensed during a purging event.
Figure 5:
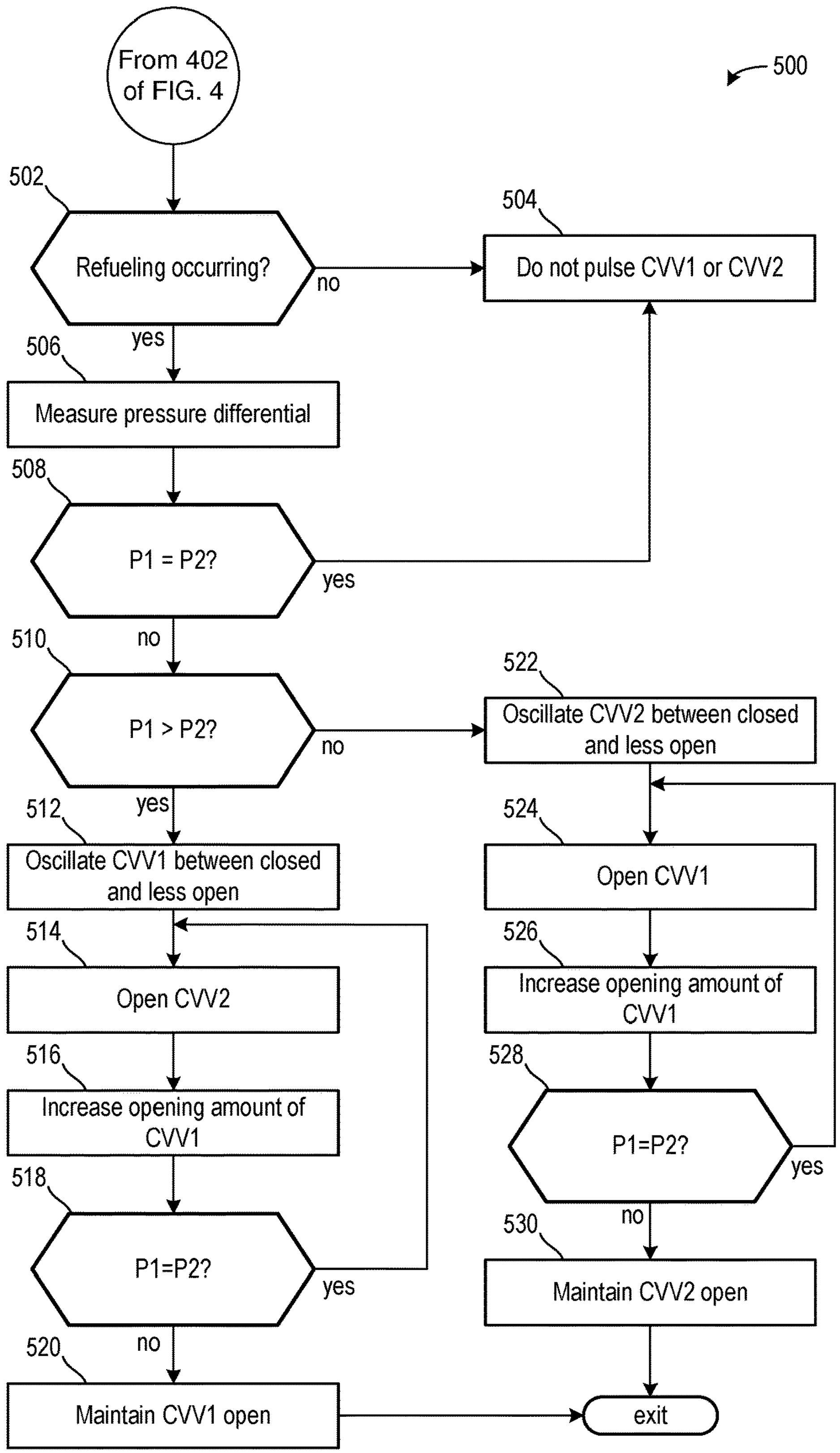
FIG. 5 illustrates a method for operating canister vent valves of canisters arranged in parallel in response to a differential pressure sensed during a refueling event.
Figure 6:
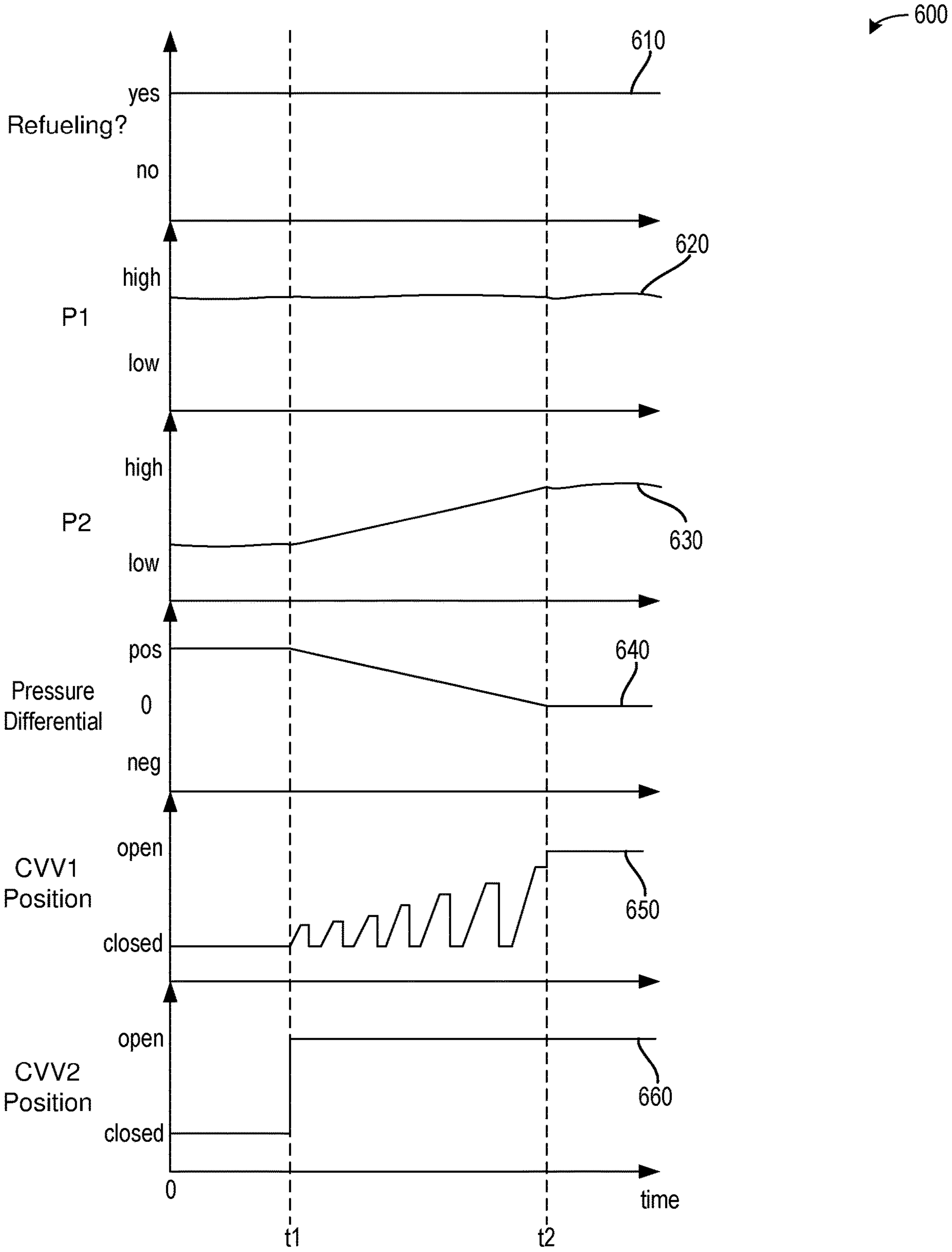
FIG. 6 graphically illustrates an engine operating sequence illustrating changes canister vent valve operation during a refueling event.

The following description relates to systems and methods for flowing vapors to parallel canisters of an evaporative emission control (EVAP) system. FIG. 1 illustrates a schematic of an engine included in a hybrid vehicle. FIG. 2. illustrates a prior art example of an engine including a single canister. FIG. 3 illustrates the engine including canisters arranged in parallel. FIG. 4 illustrates a method for operating canister vent valves of canisters arranged in parallel in response to a differential pressure sensed during a purging event. FIG. 5 illustrates a method for operating canister vent valves of canisters arranged in parallel in response to a differential pressure sensed during a refueling event. FIG. 6 graphically illustrates an engine operating sequence illustrating changes canister vent valve operation during a refueling event FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another.

As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a friction pedal and/or an foot propulsion pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be automatically actuated or pressed by a vehicle operator to initiate refueling. For example, in response to the vehicle operator actuating refueling button 197, a fuel tank in the vehicle may be depressurized so that refueling may be performed.

In some examples, vehicle propulsion system 100 may include one or more onboard cameras 135. Onboard cameras 135 may communicate photos and/or video images to control system 190, for example. Onboard cameras may in some examples be utilized to record images within a predetermined radius of the vehicle, for example.

Vehicle system 100 may also include an on-board navigation system 132 (for example, a Global Positioning System) with which an operator of the vehicle may interact. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, etc. In some examples, vehicle system 100 may include lasers, radar, sonar, acoustic sensors 133, which may enable vehicle location, traffic information, etc., to be collected via the vehicle.

The vehicle system 100 may be in wireless communication with a wireless network 131. The control system 190 may communicate with the wireless network 131 via a modem, a router, a radio signal, or the like. Data regarding various vehicle system conditions may be communicated between the control system 190 and the wireless network. Additionally or alternatively, the wireless network 131 may communicate conditions of other vehicles to the control system 190.

FIG. 2 shows a schematic depiction of a prior art example of a vehicle system 206. The vehicle system 206 includes an engine system 208 coupled to an evaporative emissions control system 251 and a fuel system 218. Evaporative emissions control system 251 (also termed evaporative emissions system 251) includes a fuel vapor container or fuel system canister 222 which may be used to capture and store fuel vapors. In some examples, vehicle system 206 may be a hybrid electric vehicle system, such as the vehicle propulsion system 100 of FIG. 1. As such, engine 210 may be similar to engine 110 of FIG. 1 while control system 214 of FIG. 2 may be the same as control system 190 of FIG. 1.

The engine system 208 may include an engine 210 having a plurality of cylinders 230. The engine 210 includes an engine intake 223 and an engine exhaust 225. The engine intake 223 includes a throttle 262 fluidly coupled to the intake manifold 244. Fresh intake air enters intake passage 242 and flows through air filter 253. Air filter 253 positioned in the intake passage 242 may clean intake air before the intake air is directed to the intake manifold 244. Cleaned intake air exiting the air filter 253 may stream past throttle 262 (also termed intake throttle 262) into intake manifold 244 via intake passage 242. As such, intake throttle 262, when fully opened, may enable a higher level of fluidic communication between intake manifold 244 and intake passage 242 downstream of air filter 253. An amount of intake air provided to the intake manifold 244 may be controlled via throttle 262 based on engine conditions. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine, such as a variety of valves and sensors.

Each cylinder 230 may be serviced by one or more valves. In the present example, each cylinder 230 includes a corresponding intake valve 264 and an exhaust valve (not shown). Each intake valve 264 may be held at a desired position via a corresponding spring. Engine system 208 further includes one or more camshafts 268 for operating intake valve 262. In the depicted example, intake camshaft 268 is coupled to intake valve 264 and can be actuated to operate intake valve 264. In some embodiments, where the intake valve of a plurality of cylinders 230 are coupled to a common camshaft, intake camshaft 268 can be actuated to operate all the intake valves of all the coupled cylinders.

Intake valve 264 is actuatable between an open position that allows intake air into the corresponding cylinder and a closed position substantially blocking intake air from the cylinder. Intake camshaft 268 may be included in intake valve actuation system 269. Intake camshaft 268 includes intake cam 267 which has a cam lobe profile for opening intake valve 264 for a defined intake duration. The lobe profile may affect cam lift height, cam duration, and/or cam timing. A controller, such as controller 212, may be able to switch the intake valve duration by moving intake camshaft 268 longitudinally and switching between cam profiles.

It will be appreciated that the intake and/or exhaust camshafts may be coupled to cylinder subsets, and multiple intake and/or exhaust camshafts may be present. Intake valve actuation system 269 may further include push rods, rocker arms, tappets, etc. As such, the intake valve actuation system may include a plurality of electromechanical actuators. Such devices and features may control actuation of the intake valve 264 by converting rotational motion of the cams into translational motion of the valves. As previously discussed, the valves can also be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 230 may each have more than one intake valve. In still other examples, each intake valve 264 of one or more cylinders may be actuated by a common camshaft. Further still, in some examples, some of the intake valves 264 may be actuated by their own independent camshaft or other device.

Engine system 208 may include variable valve timing systems, for example, variable cam timing VCT system 260. As such, VCT system 260 may be operatively and communicatively coupled to the intake valve actuation system 269. VCT system 260 may include an intake camshaft phaser 265 coupled to the common intake camshaft 268 for changing intake valve timing. VCT system 260 may be configured to advance or retard valve timing by advancing or retarding cam timing and may be controlled by controller 212. In some embodiments, valve timing such as intake valve closing (IVC) may be varied by a continuously variable valve lift (CVVL) device.

The valve/cam control devices and systems described above may be hydraulically powered, electrically actuated, or combinations thereof. In one example, a position of the camshaft may be changed via cam phase adjustment of an electrical actuator (e.g., an electrically actuated cam phaser) with a fidelity that exceeds that of most hydraulically operated cam phasers. Signal lines can send control signals to and receive a cam timing and/or cam selection measurement from VCT system 260. As such, the valve actuation systems described above may enable closing the intake valves to block fluid flow therethrough, when desired.

Though not shown in FIG. 2, vehicle system 206 may also include an exhaust gas recirculation (EGR) system for routing a desired portion of exhaust gas from the exhaust passage 235 to the intake manifold 244 via an EGR passage. The amount of EGR provided may be varied by controller 212 via adjusting an EGR valve in the EGR passage. By introducing exhaust gas to the engine 210, the amount of available oxygen for combustion is decreased, thereby reducing combustion flame temperatures and reducing the formation of NOx, for example.

Fuel system 218 may include a fuel tank 220 coupled to a fuel pump system 221. The fuel pump system 221 may include one or more pumps for pressurizing fuel delivered to the injectors of engine 210, such as the example injector 266. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol in terms of a relative alcohol amounts within a solution or in a particular volume of space, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to evaporative emissions control system 251, which includes a fuel vapor canister 222, via vapor recovery line 231. The fuel vapor canister 222 may also be simply termed canister 222 herein. Fuel vapors stored in fuel vapor canister 222 may be purged to the engine intake 223 at a later time. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill level venting valve (FLVV) 285, and conduit 275 may include a grade vent valve (GVV) 283. Further, in some examples, recovery line 231 may be coupled to a fuel filler system 219 (or refueling system 219). In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a clutch, which, when engaged, prevents the removal of the fuel cap. The clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Evaporative emissions control system 251 may include one or more emissions control devices, such as one or more fuel vapor canisters 222 (also termed, canister 222) filled with an appropriate adsorbent. The canisters are configured to temporarily trap fuel vapors (including vaporized hydrocarbons) during fuel tank refilling operations and "running loss" (that is, fuel vaporized during vehicle operation). In one example, the adsorbent used is activated charcoal. Evaporative emissions system 251 may further include a canister ventilation path or vent line 227 which may route gases out of the canister 222 to the atmosphere when storing, or trapping, fuel vapors from fuel system 218.

Vent line 227 may allow fresh air to be drawn into canister 222 when purging stored fuel vapors from canister 222 to engine intake 223 via purge line 228 and canister purge valve 261 (also termed, purge valve 261). For example, purge valve 261 may be normally closed but may be opened during certain conditions so that vacuum from engine intake manifold 244 is provided to the fuel vapor canister 222 for purging.

Fuel tank isolation valve (FTIV) 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may be stored within canister 222 and air, stripped off fuel vapors, may then be vented to atmosphere via vent line 227. Fuel vapors stored in fuel vapor canister 222 may be purged along purge line 228 to engine intake 223 via canister purge valve 261 at a later time when purging conditions exist. As such, FTIV 252 when closed may isolate and seal the fuel tank 220 from the evaporative emissions system 251. It will be noted that certain vehicle systems may not include FTIV 252.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open FTIV 252 while closing canister purge valve (CPV) 261 to direct refueling vapors into canister 222 and preventing fuel vapors from being directed into the intake manifold.

As another example, the fuel system may be operated in a refueling mode (e.g., when fuel tank refueling is requested by a vehicle operator), wherein the controller 212 may open FTIV 252, while maintaining CPV 261 closed, to depressurize the fuel tank before allowing fuel to be added therein. As such, FTIV 252 may be kept open during the refueling operation to allow refueling vapors to be stored in the canister. After refueling is completed, the FTIV may be closed.

As yet another example, the fuel system may be operated in a canister purging mode (e.g., after an emission control device light-off temperature has been attained and with the engine running), wherein the controller 212 may open CPV 261 while closing FTIV 252. Herein, the vacuum generated by the intake manifold of the operating engine may be used to draw fresh air through vent line 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold. The FTIV 252 may be closed during the purging mode.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include manifold absolute pressure (MAP) sensor 224, barometric pressure (BP) sensor 246, exhaust gas sensor 226 located in exhaust manifold 248 upstream of the emission control device, temperature sensor 233, fuel tank pressure sensor 291 (also termed a fuel tank pressure transducer or FTPT), and canister temperature sensor 232. Other sensors such as pressure, temperature, air/fuel ratio, and composition sensors may be coupled to various locations in the vehicle system 206. As another example, the actuators may include CPV 261, fuel injector 266, throttle 262, FTIV 252, fuel pump 221, and refueling lock 245. The control system 214 may include a controller 212. The controller may receive input data from the various sensors, process the input data, and trigger the actuators in response to the processed input data based on instruction or code programmed therein corresponding to one or more routines.

The controller 212 receives signals from the various sensors of FIG. 2 and employs the various actuators of FIG. 2 to adjust engine operation based on the received signals and instructions stored on a memory of the controller. For example, adjusting the canister purge valve may include adjusting an actuator of the canister purge valve to adjust a flow rate of fuel vapors therethrough. As such, controller 212 may communicate a signal to the actuator (e.g., canister purge valve solenoid) of the canister purge valve based on a desired purge flow rate. Accordingly, the canister purge valve solenoid may be opened (and pulsed) at a specific duty cycle to enable a flow of stored vapors from canister 222 to intake manifold 244 via purge line 228.

Turning now to FIG. 3, it shows an embodiment of a fuel system 300. The fuel system 300 may be used in the engine system of FIGS. 1 and/or 2. The fuel system 300 may include a fuel tank 302 configured to store one or more fuels. In one example, the fuel tank 302 may be similar to the fuel tank 220 of FIG. 2. The fuel tank 302 may include a port 304 to which a load line 306 is fluidly coupled. The load line 306 may be configured to flow fuel vapors to and/or from the fuel tank 302. A FTPT 308 may be coupled to the fuel tank 302 at a location proximal to the load line 306.

Unlike the example of FIG. 2, which includes only a single canister coupled to a load line (e.g., conduit 278), the fuel system 300 includes a first canister 320 and a second canister 340 coupled to the load line 306. In one example, the fuel system 300 is similar to the fuel system 218 of FIG. 2 except that the fuel system 300 includes at least two canisters and the fuel system 218 includes only one canister. In this way, the first and second canister 320, 340 may replace the single canister of FIG. 2 in the vehicle system 206.

The first load 306 may bifurcate and fluidly couple to a first load line 312 and a second load line 314. The first load line 312 may be fluidly coupled to a first load port 322 of the first canister 320. The second load line 314 may be fluidly coupled to a second load port 342 of the second canister 340.

Each of the first canister 320 and the second canister 340 may be coupled to a CPV 316. In one example, the CPV 316 may be identical to CPV 261 of FIG. 2. The CPV 316 may direct vapors to an engine intake during conditions, such as when combustion is occurring and fuel is being consumed. The first canister 320 may comprise a first canister purge line 324 and the second canister 340 may comprise a second canister purge line 344. The first canister purge line 324 may be coupled to the first canister 320 at a first canister purge port 326. The second canister purge line 344 may be coupled to the second canister 340 at a second canister purge port 346. The first canister purge line 324 and the second canister purge line 344 may intersect upstream of the CPV 316 relative to a direction of vapor flow.

Each of the first canister 320 and the second canister 340 may further include corresponding vent lines. The first canister 320 may include a first canister vent line 328 coupled to a first canister vent valve (CVV1) 330. The second canister 340 may include a second canister vent line 348 coupled to a second canister vent valve (CVV2) 350. The first and second vent lines may merge to form a common vent line 360. A dust box 362 may be arranged in the common vent line 360 upstream of atmosphere with respect to a direction of gas flow.

As will be described in greater detail below, the fuel system 300 may be operated to balance a loading of the first canister 320 and the second canister 340 during a refueling event and/or a purging event. The refueling event may include where fuel is admitted to the fuel tank 302. The purging event may include where vapors from the first canister 320 and the second canister 340 are directed to an engine via opening of the CPV 316. As such, the engine may be combusting during the purging event to consume vapors purged by the first canister 320 and the second canister 340. In one example, a method may include oscillating a canister vent valve (CVV) of a less loaded of the first canister 320 and the second canister 340 between an open position and a fully closed position during the purging event. A further method may include oscillating a canister vent valve (CVV) of a more loaded of the first canister 320 and the second canister 340 between an open position and a fully closed position during the refueling event. As such, the less loaded canister may be purged less than the more loaded canister during the purging event. During the refueling event, the less loaded canister may receive more vapors.

In one example, a length and a diameter of the lines to and from the canisters may be substantially identical. That is to say, a length and a diameter of the first load line 312 and the second load line 314 may be identical. A length and a diameter of the first canister purge line 324 and the second canister purge line 344 may be identical. A length and a diameter of the first canister vent line 328 and the second canister vent line 348 may be identical. A size and a volume, including carbon bed, of the first canister 320 and the second canister 340 may be identical. By doing this, restrictions of the canisters may be substantially identical, thereby promoting more even vapor flow.

A load of the canisters may be comparatively determined via a delta pressure sensor 310. The delta pressure sensor 310 may be coupled to the first canister purge line 324 and the second canister purge line 344. An imbalance (e.g., a pressure differential) sensed by the delta pressure sensor 310 corresponds with a difference in loading of one of the first canister 320 and the second canister 340.

In some examples, additionally or alternatively, operation of CVV1 330 and CVV2 350 may be directly based on feedback from the delta pressure sensor 310. If a pressure differential is sensed by the delta pressure sensor 310, thereby indicating an imbalance between the first canister 320 and the second canister 340, then a CVV of a less loaded canister may be oscillated during a purging event. Alternatively, if a pressure differential is sensed by the delta pressure sensor 310 during a refueling event, then a CVV of a more loaded canister may be oscillated. Operation of the CVV1 330 and the CVV2 350 during purging and refueling events based on feedback from the delta pressure sensor 310 is described in greater detail below.

Turning now to FIG. 4, it shows a method 400 for adjusting operation of CVV1 of the first canister or CVV2 of the second canister in response to an imbalance sensed during a purging event. Instructions for carrying out method 400 and the rest of the methods included herein may be executed by a controller based on instructions stored on a memory of the controller and in conjunction with signals received from sensors of the engine system, such as the sensors described above with reference to FIGS. 1 and 3. The controller may employ engine actuators of the engine system to adjust operation, according to the methods described below.

The method 400 begins at 402, which includes determining if a purging event is occurring. The purging event may include flowing fuel vapors from the canisters to the engine. As such, the CVV1 and the CVV2 may be signaled to open and the CPV may be signaled to open.

If a purging event is not occurring, then the method 400 may proceed to 502 of method 500 as seen in FIG. 5 described below. If a purging event is occurring, then at 404, the method 400 may include measuring a pressure differential. The pressure differential may be measured via the delta pressure sensor coupled to the first canister vent line and the second canister vent line. The delta pressure sensor may be configured to measure a difference (e.g., a pressure differential) between the first and second canister vent lines. In some examples, the pressure differential may be correlated to a respective load of the canisters.

At 406, the method 400 may include determining if P1 is equal to P2. P1 may correspond to a pressure sensed in the first canister vent line and P2 may correspond to a pressure sensed in the second canister vent line. If P1 is equal to P2, then a pressure differential is not present and loads of the canisters are balanced.

At 408, the method 400 may include maintaining CVV1 and CVV2 open during the purging event. As such, each of the first canister and the second canister may be purged equally.

Returning to 406, if P1 is not equal to P2, then at 410, the method 400 may include determining if P1 is greater than P2. During the purging event, a negative pressure may develop in the evaporative emission system. If a positive pressure differential is sensed (e.g., P1>P2), then the second canister is more restricted and include a higher load than the first canister.

If P1 is greater than P2, then at 412, the method 400 may include oscillating CVV1 between closed and open positions. As such, the CVV of the less loaded canister is oscillated. In one example, the open positions are less than fully open positions in which 100% flow is permitted. A magnitude of the opening of the open position may be inversely related to the pressure differential sensed. For example, a more positive pressure differential may include a less open position of CVV1. As another example, a less positive pressure differential may include a more open position of CVV1. As such, an amount of purging of the first canister may be adjusted based on an amount of restriction in the second canister. In one example, as the second canister is more restricted and further increases the imbalance, the first canister may be purged less during the purging event. Purging the first canister less may include oscillating CVV1 between a fully closed position and a less open position.

Additionally or alternatively, a degree of purging may be further adjusted via adjusting a duration of time in which CVV1 remains in the fully closed position and the open position. In this way, CVV1 may be a two-position valve, wherein an amount of time in which CVV1 remains fully closed may be decreased as the pressure differential approaches zero.

At 414, the method 400 may include opening CVV2. CVV2 may be opened to a fully open position to allow a full purge of the second canister. In this way, a balance between the first canister and the second canister may be reached more quickly.

At 416, the method 400 may include increasing an opening amount of CVV1. CVV1 may still be oscillated between open and closed positions. However, the magnitude of the opening of the open position may increase. As such, the first canister may be increasingly purged as the method proceeds and the imbalance between the first canister and the second canister decreases.

At 418, the method 400 may include determining if P1 is equal to P2. If P1 is still not equal to P2, then the method 400 may continue to oscillate CVV1 and increase its opening amount when in the open position until a balance is reached and no pressure differential is sensed.

If P1 is equal to P2, then at 420 the method 400 may include maintaining CVV1 open. As such, the first canister and the second canister may be purged relatively equally once the pressure differential is no longer sensed and the first canister is balanced with the second canister. By doing this, purge time for the first canister may not be missed during the purging event while a balance between the first canister and the second canister is achieved.

Returning to 410, if P1 is not greater than P2, then P2 is greater than P1. As such, the first canister is more restricted than the second canister. In this way, it may be desired to oscillate the CVV of the less loaded canister, such as the second canister.

At 422, the method 400 may include oscillating CVV2 between closed and open positions. In one example, the open positions are less than fully open positions (e.g., 100% flow). A magnitude of the opening of the open position may be inversely related to the pressure differential sensed. For example, a more negative pressure differential may include a less open position of CVV2. As another example, a less negative pressure differential may include a more open position of CVV2. As such, an amount of purging of the second canister may be adjusted based on an amount of restriction in the first canister. In one example, as the first canister is more restricted and further increases the imbalance, the second canister may be purged less during the purging event. Purging the second canister less may include oscillating CVV2 between a fully closed position and a less open position such that the second canister is at least partially purged during the purging event.

Additionally or alternatively, a degree of purging may be further adjusted via adjusting a duration of time in which CVV2 remains in the fully closed position and the open position. In some examples, CVV2 may be a two-position valve, wherein an amount of time in which CVV2 remains fully closed may be decreased as the pressure differential approaches zero. In this way, manufacturing resources of the evaporative emissions system may be decreased.

At 424, the method 400 may include opening CVV1. CVV1 may be opened to a fully open position to allow a full purge of the first canister. In this way, a balance between the first canister and the second canister may be reached more quickly.

At 426, the method 400 may include increasing an opening amount of CVV2. CVV2 may still be oscillated between open and closed positions. However, the magnitude of the opening of the open position may increase. As such, the second canister may be increasingly purged as the method proceeds and the imbalance (e.g., pressure differential) between the first canister and the second canister decreases.

At 428, the method 400 may include determining if P1 is equal to P2. If P1 is not equal to P2, then the method 400 may continue to oscillate CVV2 and increase its opening amount when in the open position until a balance is reached and no pressure differential is sensed. CVV1 may remain fully open.

If P1 is equal to P2, then at 430, the method 400 may include maintaining the CVV2 open. As such, the CVV2 may no longer be oscillated. In one example, the CVV2 may be opened to an identical position of the CVV1.

Turning now to FIG. 5, it shows a method 500 for adjusting operation of CVV1 of the first canister or CVV2 of the second canister in response to an imbalance sensed during a refueling event.

The method 500 begins at 502 following determination that a purging event is not occurring at 402 of FIG. 4. At 502, the method 500 includes determining if a refueling event is occurring. The purging event may include supplying fuel to a fuel tank of the vehicle. The fuel tank may be fluidly coupled to the evaporative emission system including the first canister and the second canister. During the refueling event, a pressure of the fuel tank may be increased and removal of fuel vapors generated therein may be desired to reach a fill level of the fuel tank.

If a refueling event is not occurring, then the method 500 may proceed to 504 of method 500, which include not pulsing CVV1 or CVV2. As such, CVV1 and/or CVV2 may be maintained in closed or open positions. The vehicle may be operating in a coasting mode, an all-electric mode, or other mode where purging and refueling are not occurring.

If a refueling event is occurring, then at 506, the method 500 may include measuring a pressure differential. The pressure differential may be measured via the delta pressure sensor coupled to the first canister vent line and the second canister vent line. The delta pressure sensor may be configured to measure a difference (e.g., a pressure differential) between the first and second canister vent lines. In some examples, the pressure differential may be correlated to a respective load of the canisters.

At 508, the method 500 may include determining if P1 is equal to P2. P1 may correspond to a pressure sensed in the first canister vent line and P2 may correspond to a pressure sensed in the second canister vent line. If P1 is equal to P2, then a pressure differential is not present and loads of the canisters are balanced and the method 500 proceeds to 504. During the refueling event where the first canister and the second canister are balanced and a pressure differential is not sensed, CVV1 and CVV2 may be commanded to identical positions. By doing this, the balance may be maintained.

If P1 is not equal to P2, then at 510, the method 500 may include determining if P1 is greater than P2. During the refueling event, a positive pressure may develop in the evaporative emission system. If a positive pressure differential is sensed (e.g., P1>P2), then the first canister is more restricted and include a higher load than the second canister.

If P1 is greater than P2, then at 512, the method 500 may include oscillating CVV1 between closed and open positions. As such, the CVV of the more loaded canister is oscillated during the refueling event. In one example, the open positions are less than fully open positions (e.g., 100% flow). A magnitude of the opening of the open position may be inversely related to the pressure differential sensed. For example, a more positive pressure differential may include a less open position of CVV1. As another example, a less positive pressure differential may include a more open position of CVV1. As such, an amount of vapor flow to the first canister may be adjusted based on the restriction of the first canister. In one example, as the first canister is more restricted and further increases the imbalance, the first canister may receive less fuel vapor during the refueling event. Loading the first canister less may include oscillating CVV1 between a fully closed position and a less open position.

Additionally or alternatively, a degree of loading may be further adjusted via adjusting a duration of time in which CVV1 remains in the fully closed position and a fully open position.

At 514, the method 500 may include opening CVV2. CVV2 may be opened to a fully open position to allow a highest magnitude of vapor flow to the second canister. In this way, a balance between the first canister and the second canister may be reached more quickly.

At 516, the method 500 may include increasing an opening amount of CVV1. CVV1 may be oscillated between open and closed positions. However, the magnitude of the opening of the open position may increase. As such, the first canister may receive more vapor flow as the method proceeds and the imbalance between the first canister and the second canister decreases.

At 518, the method 500 may include determining if P1 is equal to P2. If P1 is not equal to P2, then the method 500 may continue to oscillate CVV1 and increase its opening amount when in the open position until a balance is reached and no pressure differential is sensed.

If P1 is equal to P2, then at 520 the method 500 may include maintaining CVV1 open. As such, the first canister and the second canister may be loaded relatively equally once the pressure differential is no longer sensed and the first canister is balanced with the second canister. By doing this, both canisters may be loaded during the refueling event which may enhance customer satisfaction and canister longevity.

Returning to 510, if P1 is not greater than P2, then P2 is greater than P1. As such, the first second canister is more restricted than the first canister. In this way, it may be desired to oscillate the CVV of the more loaded canister, such as the second canister.

At 522, the method 500 may include oscillating CVV2 between closed and open positions. In one example, the open positions are less than fully open positions (e.g., 100% flow). A magnitude of the opening of the open position may be inversely related to the pressure differential sensed. For example, a more negative pressure differential may include a less open position of CVV2. As another example, a less negative pressure differential may include a more open position of CVV2. As such, an amount of loading of (e.g., vapor flow to) the second canister may be adjusted based on an amount of restriction in the second canister. In one example, as the second canister is more restricted and further increases the imbalance, the second canister may be loaded less during the refueling event. Loading the second canister less may include oscillating CVV2 between a fully closed position and a less open position such that the second canister loaded to a lesser magnitude during the refueling event compared to the first canister.

Additionally or alternatively, a degree of purging may be further adjusted via adjusting a duration of time in which CVV2 remains in the fully closed position and the open position. In some examples, CVV2 may be a two-position valve, wherein an amount of time in which CVV2 remains fully closed may be decreased as the pressure differential approaches zero. In this way, manufacturing resources of the evaporative emissions system may be decreased.

At 524, the method 500 may include opening CVV1. CVV1 may be opened to a fully open position to allow a high magnitude of loading of the first canister. In this way, a balance between the first canister and the second canister may be reached more quickly as the first canister will become increasingly restricted.

At 526, the method 500 may include increasing an opening amount of CVV2. CVV2 may still be oscillated between open and closed positions. However, the magnitude of the opening of the open position may increase. As such, the second canister may be increasingly loaded as the method proceeds and the imbalance (e.g., pressure differential) between the first canister and the second canister decreases.

At 528, the method 500 may include determining if P1 is equal to P2. If P1 is not equal to P2, then the method 500 may continue to oscillate CVV2 and increase its opening amount when in the open position until a balance is reached and no pressure differential is sensed. CVV1 may remain fully open.

If P1 is equal to P2, then at 530, the method 500 may include maintaining the CVV2 open. As such, the CVV2 may no longer be oscillated. In one example, the CVV2 may be opened to an identical position of the CVV1. In this way, the first canister and the second canister may be evenly loaded.

Turning now to FIG. 6, it shows an operating sequence 600 graphically illustrating a refueling event. Plot 610 indicates if a refueling event is occurring. Plot 620 indicates a first pressure (P1) sensed in a vent line coupled to a first canister. Plot 630 indicates a second pressure (P2) sensed in a vent line coupled to a second canister. Plot 640 indicates a pressure differential sensed by a delta pressure sensor. Plot 650 indicates an operation of a first CVV (CVV1) of the first canister. Plot 660 indicates an operation of a second CVV (CVV2) of the second canister. Time increases from a left to right side of the figure.

Prior to t1, a refueling event is occurring. P1 and P2 are sensed via a delta pressure sensor. A pressure differential based on P1 and P2 is positive, thereby indicating the first canister is more restricted than the second canister. The restriction of the canister may be proportional to a load of the canister, wherein the restriction increases as the load increases. In this way, the first canister is more loaded than the second canister. As such, to balance the canister during the refueling event while still flowing vapors to both canisters, it may be desired to oscillate CVV1 to decrease vapor flow to the first canister while still allowing a partial loading of the first canister.

At t1, CVV2 is moved to a fully open position. As such, the CVV of the less loaded canister is moved to the fully open position during the refueling event. Between t1 and t2, CVV1 is oscillated between a fully closed position and open positions with differing magnitudes of openness. For example, as the pressure differential approaches 0, CVV1 may be commanded to slightly more open positions compared to an open position of a previous oscillation. Additionally, a duration of time spent in the open position is increased. By doing this, a balancing of the first canister and the second canister may be more accurate and prevent overloading of the second canister.

At t2, the pressure differential is equal to 0. As such, P1 is equal to P2, thereby indicating a balance between the first canister and the second canister. CVV1 is commanded to the fully open position.

After t2, CVV1 and CVV2 are both in fully open positions. As such, both canisters may be loaded evenly during a remainder of the refueling event.

The technical effect of adjusting operation of a CVV based on feedback from a delta pressure sensor is to provide additional opportunities for canister balancing due to decreased engine runtime in hybrid vehicles. The CVV of a less loaded canister may be oscillated during purging events to allow a more loaded canister to undergo a relatively larger amount of purging while still purging the less loaded canister. The CVV of a more loaded canister may be oscillated during refueling events to allow a less loaded canister to be loaded more while still loading the more loaded canister.

The disclosure provides support for a system including a delta pressure sensor arranged between a first purge line coupled to a first canister and a second purge line coupled to a second canister arranged in parallel with the first canister. A first example of the system further includes where the first canister and the second canister are fuel vapor canisters. A second example of the system, optionally including the first example, further includes where a first canister vent valve (CVV1) is configured to control vapor flow between a first canister vent line and the first canister. A third example of the system, optionally including one or more of the previous examples, further includes where a second canister vent valve (CVV2) is configured to control vapor flow between a second canister vent line and the second canister. A fourth example of the system, optionally including one or more of the previous examples, further includes a controller with instructions stored in non-transitory memory thereof that when executed cause the controller to command opening and closing of a canister vent valve of a less loaded canister during a purging of the first canister and the second canister, wherein a load of the first canister and the second canister is comparatively measured via the delta pressure sensor. A fifth example of the system, optionally including one or more of the previous examples, further includes where the instructions further cause the controller to command opening and closing of a canister vent valve of a more loaded canister during a refueling event. A sixth example of the system, optionally including one or more of the previous examples, further includes where the instructions further cause the controller to command the canister vent valve to more open positions during an oscillation between open and closed as a pressure differential sensed by the delta pressure sensor approaches zero.

The disclosure provides additional support for a method including oscillating a canister vent valve of a less loaded canister during purging of at least two canisters arranged in parallel between an open position and a closed position, wherein a load of the at least two canisters is comparatively measured via a delta pressure sensor arranged between purge lines of the at least two canisters. A first example of the method further includes where the oscillating further comprises increasing an opening amount of the canister vent valve as a differential pressure sensed by the delta pressure sensor approaches zero. A second example of the method, optionally including the first example, further includes where a canister vent valve of a more loaded canister during purging of the at least two canisters is fully open. A third example of the method, optionally including one or more of the previous examples, further includes oscillating a canister vent valve of a more loaded canister during a refueling event. A fourth example of the method, optionally including one or more of the previous examples, further includes where the canister vent valve of the less loaded canister is fully open during the refueling event. A fifth example of the method, optionally including one or more of the previous examples, further includes where the refueling event comprises flowing fuel to a fuel tank fluidly coupled to the at least two canisters. A sixth example of the method, optionally including one or more of the previous examples, further includes where the purging comprises flowing vapors from the at least two canisters to an engine of a vehicle. A seventh example of the method, optionally including one or more of the previous examples, further includes where the canister vent valve is arranged in a purge line of the less loaded canister.

The disclosure provides further support for a system including a first canister arranged in parallel with a second canister, a delta pressure sensor coupled to purge lines of the first canister and the second canister, and a controller comprising instructions in memory that cause the controller to oscillate a canister vent valve between an open position and a closed position of a less loaded of the first canister and the second canister during a purging event. A first example of the system further includes where the open position is more open as a pressure differential sensed by the delta pressure sensor approaches zero. A second example of the system, optionally including the first example, further includes where the instructions further cause the controller to fully open the canister vent valve in response to a pressure differential sensed by the delta pressure sensor being equal to zero. A third example of the system, optionally including one or more of the previous examples, further includes where the canister vent valve is one of two canister vent valves, wherein each of the two canister vent valves is arranged in a corresponding vent line of the first canister and the second canister. A fourth example of the system, optionally including one or more of the previous examples, further includes where the first canister and the second canister are fluidly coupled to an engine during the purging event.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:

a first canister arranged in parallel with a second canister;

a first purge line coupled between the first canister and an engine, and a second purge line coupled between the second canister and the engine;

a first vent line coupling the first canister to atmosphere and a second vent line coupling the second canister to atmosphere; and a delta pressure sensor coupled to the first purge line and the second purge line.

2. The system of claim 1, wherein the first canister and the second canister are fuel vapor canisters.

3. The system of claim 1, wherein a first canister vent valve (CVV1) is configured to control vapor flow between a first canister vent line and the first canister, and wherein a second canister vent valve (CVV2) is configured to control vapor flow between a second canister vent line and the second canister.

4. The system of claim 3, further comprising a controller with instructions stored in non-transitory memory thereof that when executed cause the controller to, during purging of the first canister and the second canister, open a canister purge valve coupled between the engine and the first canister and the second canister, and oscillate the CVV1 between closed and open positions responsive to a pressure differential measured by the delta pressure sensor indicating the first canister is more restricted than the second canister, while maintaining the CVV2 open.

5. The system of claim 1, further comprising a controller with instructions stored in non-transitory memory thereof that when executed cause the controller to command opening and closing of a canister vent valve of a less loaded canister during a purging of the first canister and the second canister, wherein a load of the first canister and the second canister is comparatively measured via the delta pressure sensor.

6. The system of claim 5, wherein the instructions further cause the controller to command opening and closing of a canister vent valve of a more loaded canister during a refueling event.

7. The system of claim 5, wherein the instructions further cause the controller to command the canister vent valve to more open positions during an oscillation between open and closed as a pressure differential sensed by the delta pressure sensor approaches zero.

8. A method, comprising:

oscillating a canister vent valve of a less loaded canister during purging of at least two canisters arranged in parallel between an open position and a closed position, wherein a load of the at least two canisters is comparatively measured via a delta pressure sensor arranged between purge lines of the at least two canisters.

9. The method of claim 8, wherein the oscillating further comprises increasing an opening amount of the canister vent valve as a differential pressure sensed by the delta pressure sensor approaches zero.

10. The method of claim 8, wherein a canister vent valve of a more loaded canister during purging of the at least two canisters is fully open.

11. The method of claim 8, further comprising oscillating a canister vent valve of a more loaded canister during a refueling event.

12. The method of claim 11, wherein the canister vent valve of the less loaded canister is fully open during the refueling event.

13. The method of claim 11, wherein the refueling event comprises flowing fuel to a fuel tank fluidly coupled to the at least two canisters.

14. The method of claim 8, wherein the purging comprises flowing vapors from the at least two canisters to an engine of a vehicle.

15. The method of claim 8, wherein the canister vent valve is arranged in a purge line of the less loaded canister.

16. A system, comprising:

a first canister arranged in parallel with a second canister;

a delta pressure sensor coupled to purge lines of the first canister and the second canister, the purge lines of the first canister and the second canister fluidly coupled to an engine; and a controller comprising instructions in memory that cause the controller to oscillate a canister vent valve between an open position and a closed position of a less restricted of the first canister and the second canister during a purging event, the less restricted of the first canister and the second canister determined based on a pressure differential sensed by the delta pressure sensor.

17. The system of claim 16, wherein the open position is more open as the pressure differential sensed by the delta pressure sensor approaches zero.

18. The system of claim 16, wherein the instructions further cause the controller to fully open the canister vent valve in response to the pressure differential sensed by the delta pressure sensor being equal to zero.

19. The system of claim 16, wherein the canister vent valve is one of two canister vent valves, and wherein each of the two canister vent valves is arranged in a corresponding vent line of the first canister and the second canister.

20. The system of claim 16, wherein the first canister and the second canister are fluidly coupled to the engine during the purging event via the purging lines.

* * * * *